United States Patent
Nanbu

(10) Patent No.: US 9,858,512 B2
(45) Date of Patent: Jan. 2, 2018

(54) IMAGE PROCESSING APPARATUS WITH AN IMPROVED DETECTION OF RULED LINES

(71) Applicant: KYOCERA Document Solutions Inc., Osaka (JP)

(72) Inventor: Sota Nanbu, Osaka (JP)

(73) Assignee: Kyocera Document Solutions Inc. (JP)

(*) Notice: Subject to any disclaimer, the term of this patent is extended or adjusted under 35 U.S.C. 154(b) by 0 days.

(21) Appl. No.: 15/219,100

(22) Filed: Jul. 25, 2016

(65) Prior Publication Data

US 2017/0032227 A1 Feb. 2, 2017

(30) Foreign Application Priority Data

Jul. 30, 2015 (JP) .................................. 2015-151351

(51) Int. Cl.
| | |
|---|---|
| G06F 15/00 | (2006.01) |
| G06K 15/02 | (2006.01) |
| G06K 9/00 | (2006.01) |
| G06K 15/00 | (2006.01) |

(52) U.S. Cl.
CPC ..... *G06K 15/1843* (2013.01); *G06K 9/00449* (2013.01)

(58) Field of Classification Search
CPC ............... G06K 9/00449; G06K 15/02; G06K 15/1817; G06K 15/1851; G06K 15/1843; H04N 1/3935; B41J 2/325; B41J 2/03
USPC .................................. 358/1.1–1.18; 382/300
See application file for complete search history.

(56) References Cited

U.S. PATENT DOCUMENTS

| | | | | |
|---|---|---|---|---|
| 2005/0052524 A1* | 3/2005 | Isono | ..................... | B41J 2/325 347/217 |
| 2006/0228047 A1* | 10/2006 | Harada | ................ | H04N 7/0122 382/298 |
| 2009/0180713 A1* | 7/2009 | Bucha | ................... | G06T 3/0012 382/300 |
| 2011/0206295 A1* | 8/2011 | Tokunaga | ............ | H04N 1/3875 382/298 |
| 2012/0008874 A1* | 1/2012 | Soutsuka | ............. | G06K 9/3283 382/286 |
| 2014/0282800 A1* | 9/2014 | Morita | ............... | H04N 21/6332 725/119 |

FOREIGN PATENT DOCUMENTS

| | | |
|---|---|---|
| JP | H06-004704 | 1/1994 |
| JP | 2003-317107 | 11/2003 |

* cited by examiner

*Primary Examiner* — Gabriel Garcia

(57) ABSTRACT

An image processing apparatus includes a reduction processing unit, a connecting pixel group detecting unit, and a ruled line determining unit. The reduction processing unit is configured to (a) set a reduction direction as one of a horizontal direction and a vertical direction, and (b) reduce an original image along the reduction direction by a predetermined reduction ratio without reducing the original image along a direction perpendicular to the reduction direction and thereby generate a reduced image. The connecting pixel group detecting unit is configured to detect a connecting pixel group in the reduced image, the connecting pixel group continuously extending along the reduction direction. The ruled line determining unit is configured to determine a position of a ruled line in the original image from a position of the connecting pixel group in the reduced image on the basis of the reduction ratio.

4 Claims, 4 Drawing Sheets

IMAGE PROCESSING APPARATUS WITH AN IMPROVED DETECTION OF RULED LINES

CROSS-REFERENCE TO RELATED APPLICATIONS

This application relates to and claims priority rights from Japanese Patent Application No. 2015-151351, filed on Jul. 30, 2015, the entire disclosures of which are hereby incorporated by reference herein.

BACKGROUND

1. Field of the Present Disclosure

The present disclosure relates to an image processing apparatus.

2. Description of the Related Art

A ruled line detecting method generates a reduced image from an original image, and detects a connecting component of black pixels in the generated reduced image so that the connecting component corresponds to a ruled line in the original image.

When reducing an original image, the original image is usually reduced in a horizontal direction and a vertical direction at the same time, and a pixel value of a pixel in the reduced image is determined from pixel values of pixels in a window having a predetermined size (e.g. 2 pixels×2 pixels) in the original image.

For example, a pixel value of a pixel in the reduced image is set as an average value of the pixel values of the pixels in the window in the original image. Further, for example, if the original image is a binary image, then a pixel value of a pixel in the reduced image is set as a logical sum of the pixel values of the pixels in the window in the original image.

When a pixel value of a pixel in the reduced image is set as an average value of the pixel values of the pixels in the window in the original image, if the reduced image includes connecting pixels corresponding to a ruled line that is a thin line of one pixel width in the original image, then the connecting pixels sometimes improperly get a low density (i.e. improperly gets a high luminance value), and consequently the connecting pixels in the reduced image are sometimes not correctly detected and therefore the ruled line in the original image is sometimes not correctly detected.

Further, when a pixel value of a pixel in the reduced image is set as a logical sum of the pixel values of the pixels in the window in the original image, an improper pattern sometimes appears as connecting pixels in the reduced image independently of the ruled line in the original image.

SUMMARY

An image processing apparatus according to an aspect of the present disclosure includes a reduction processing unit, a connecting pixel group detecting unit, and a ruled line determining unit. The reduction processing unit is configured to (a) set a reduction direction as one of a horizontal direction and a vertical direction, and (b) reduce an original image along the reduction direction by a predetermined reduction ratio without reducing the original image along a direction perpendicular to the reduction direction and thereby generate a reduced image. The connecting pixel group detecting unit is configured to detect a connecting pixel group in the reduced image, the connecting pixel group continuously extending along the reduction direction. The ruled line determining unit is configured to determine a position of a ruled line in the original image from a position of the connecting pixel group in the reduced image on the basis of the reduction ratio.

These and other objects, features and advantages of the present disclosure will become more apparent upon reading of the following detailed description along with the accompanied drawings.

DETAILED DESCRIPTION

Hereinafter, an embodiment according to an aspect of the present disclosure will be explained with reference to drawings.

Figure 1:
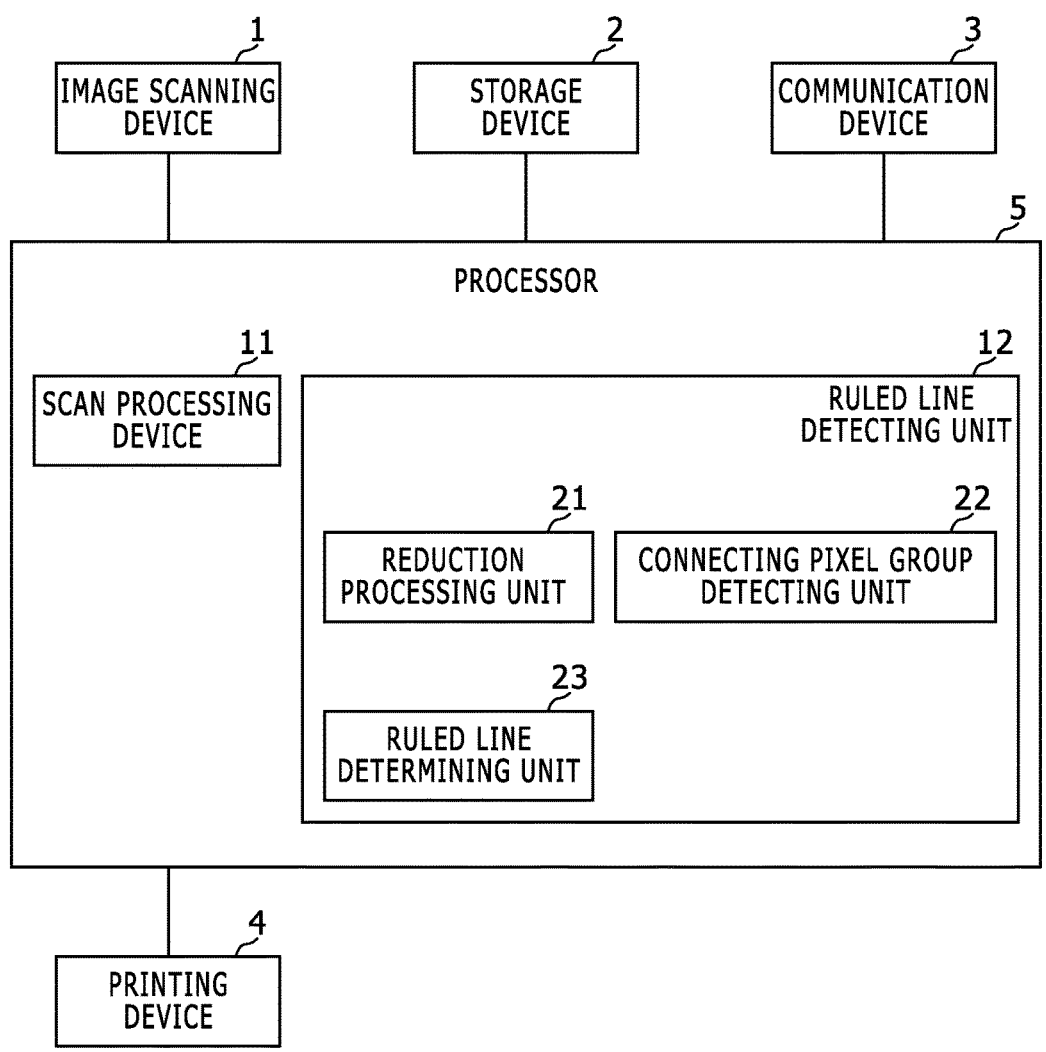
FIG. 1 shows a block diagram that indicates a configuration of an image processing apparatus according to an embodiment of the present disclosure.

FIG. 1 shows a block diagram that indicates a configuration of an image processing apparatus according to an embodiment of the present disclosure. The image processing apparatus shown in FIG. 1 includes an image scanning device 1, a storage device 2, a communication device 3, a printing device 4, and a processor 5.

The image scanning device 1 is an internal device that optically scans a document image of a document, and generates image data (RGB data, here) of the document image.

The storage device 2 is a device capable of storing data and programs. A non-volatile storage medium with a large capacity is used as the storage device 2, such as non-volatile memory or hard disk drive. The storage device 2 is enabled, for example, to store the image data of the document image.

The communication device 3 is a device which performs data communication with an external device. A network interface which performs network communication, a modem which performs facsimile communication or the like is used as the communication device 3.

The printing device 4 performs printing of a document image based on image data of the document image for which image processing has been processed such as color conversion and halftone process for printing.

The processor 5 is a computer that includes a CPU (Central Processing Unit), a ROM (Read Only Memory), a RAM (Random Access Memory) and the like, loads a program from the ROM or the storage device 2 to the RAM, and executes the program with the CPU to embody various processing units. In this embodiment, a scan processing unit 11 and a ruled line detecting unit 12 are embodied in the processor 5.

The scan processing unit 11 controls the image scanning device 1, and thereby obtains a document image and stores image data of the document image in the storage device 2, the RAM, or the like.

The ruled line detecting unit 12 detects a ruled line in the document image (i.e. an original image). Here the ruled line to be detected is a thin line of one pixel width.

The ruled line detecting unit 12 includes a reduction processing unit 21, a connecting pixel group detecting unit 22, and a ruled line determining unit 23.

The reduction processing unit 21 (a) sets a reduction direction as one of a horizontal direction (i.e. a primary scanning direction) and a vertical direction (i.e. secondary scanning direction), and (b) reduces an original image along the reduction direction by a predetermined reduction ratio without reducing the original image along a direction perpendicular to the reduction direction and thereby generates a reduced image.

In this process, the reduction processing unit 21 converts plural pixels in the original image to one pixel in the reduced image, and sets a pixel value of the one pixel as an average value of pixel values of the plural pixels in the original image. For example, if two continuous pixels in the horizontal direction in the original image are converted to one pixel in the reduced image, then a pixel value of this one pixel in the reduced image is set as an average value of pixel values of these two pixels in the original image.

In order to detect a dashed ruled line in the original image, the reduction ratio is set on the basis of a gap between segments in the dashed line. The dashed line includes plural segments with a predetermined gap. The reduction ratio is set as a reciprocal number of a larger number than the number of pixels in the gap between the segments. Consequently, a dashed ruled line to be detected appears as a continuously connecting pixel group in the reduced image.

The connecting pixel group detecting unit 22 detects a connecting pixel group in the reduced image generated by the reduction processing unit 21. Here the connecting pixel group continuously extends along the reduction direction. For example, the connecting pixel group detecting unit 22 detects the connecting pixel group using an existing edge extracting process, a labeling process and the like.

Here the connecting pixel group is plural pixels that (a) have densities equal to or larger than a predetermined threshold value and (b) continue in line. In addition, here a ruled line to be detected is a thin line of one pixel width, and therefore the connecting pixel group gets one pixel width as well.

The ruled line determining unit 23 determines in the original image a position of a ruled line corresponding to the detected connecting pixel group (e.g. pixel coordinate values of two end points thereof) from a position of the connecting pixel group detected in the aforementioned reduced image (e.g. pixel coordinate values of two end points thereof) on the basis of the aforementioned reduction ratio. A relationship between a pixel in the original image and a pixel in the reduced image is determined by the reduction ratio, and therefore a corresponding pixel in the original image to a pixel in the reduced image is determined on the basis of the reduction ratio.

The following part explains a behavior of the aforementioned image processing apparatus.

(a) Detection of a Horizontally Ruled Line

Figure 2:
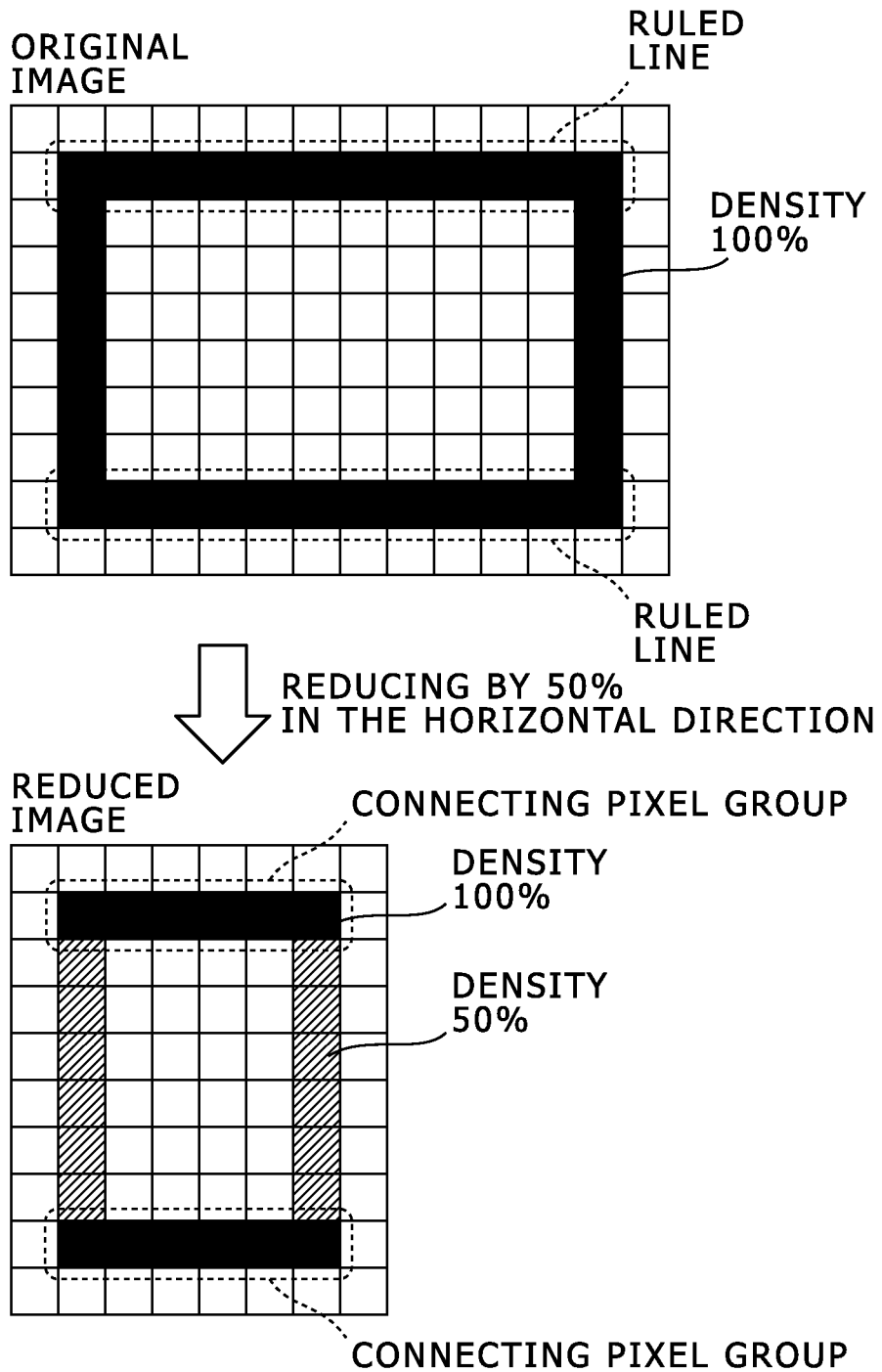
FIG. 2 shows a diagram that explains detection of a horizontal ruled line in an original image in the image processing apparatus shown in FIG. 1.

FIG. 2 shows a diagram that explains detection of a horizontal ruled line in an original image in the image processing apparatus shown in FIG. 1.

When detecting a horizontally ruled line in an original image, the reduction processing unit 21 sets a reduction direction as the horizontal direction, and reduces the original image along the horizontal direction by a predetermined reduction ratio without reducing the original image along the vertical direction, and thereby generates a reduced image. Consequently, for example, as shown in FIG. 2, a horizontally ruled line having a density of 100% in the original image appears as a horizontally connecting pixel group having a density of 100% in the reduced image.

The connecting pixel group detecting unit 22 refers to pixel values along the horizontal direction in turn at each pixel position in the vertical direction in the reduced image, and thereby detects a connecting pixel group that continuously extends along the horizontal direction, and stores position information of the detected connecting pixel group into a memory or the like. Afterward, from the position of the detected connecting pixel group, the ruled line determining unit 23 determines a position of a corresponding horizontally ruled line in the original image to this connecting pixel group. In an example shown in FIG. 2, two horizontally ruled lines in the original image are determined.

(b) Detection of a Vertically Ruled Line

Figure 3:
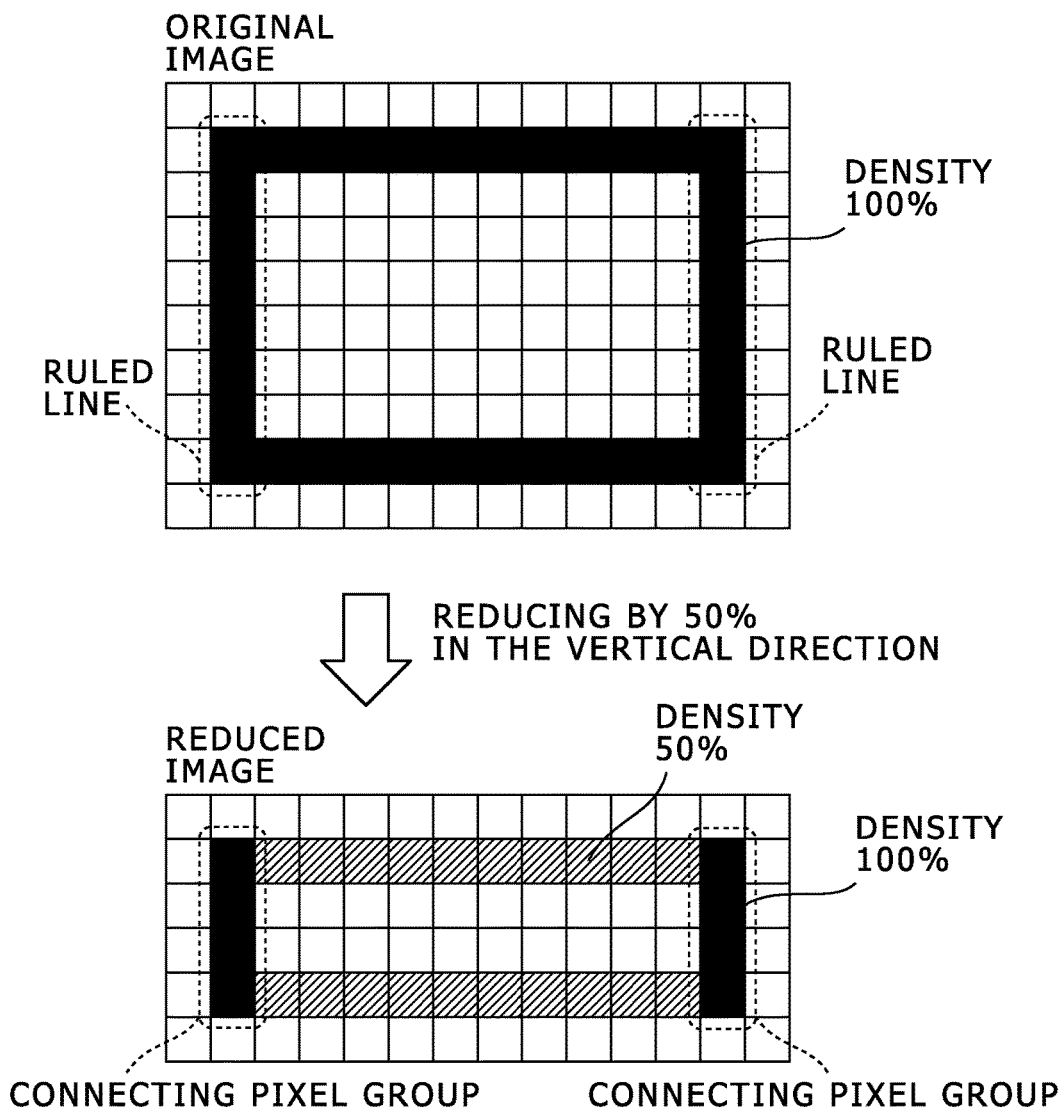
FIG. 3 shows a diagram that explains detection of a vertical ruled line in an original image in the image processing apparatus shown in FIG. 1.

FIG. 3 shows a diagram that explains detection of a vertical ruled line in an original image in the image processing apparatus shown in FIG. 1.

When detecting a vertically ruled line in an original image, the reduction processing unit 21 sets a reduction direction as the vertical direction, and reduces the original image along the vertical direction by a predetermined reduction ratio without reducing the original image along the horizontal direction, and thereby generates a reduced image. Consequently, for example, as shown in FIG. 3, a vertically ruled line having a density of 100% in the original image appears as a vertically connecting pixel group having a density of 100% in the reduced image.

The connecting pixel group detecting unit 22 refers to pixel values along the vertical direction in turn at each pixel position in the horizontal direction in the reduced image, and thereby detects a connecting pixel group that continuously extends along the vertical direction, and stores position information of the detected connecting pixel group into a memory or the like. Afterward, from the position of the detected connecting pixel group, the ruled line determining unit 23 determines a position of a corresponding vertically ruled line in the original image to this connecting pixel group. In an example shown in FIG. 3, two vertically ruled lines in the original image are determined.

(c) Detection of a Dashed Ruled Line

Figure 4:
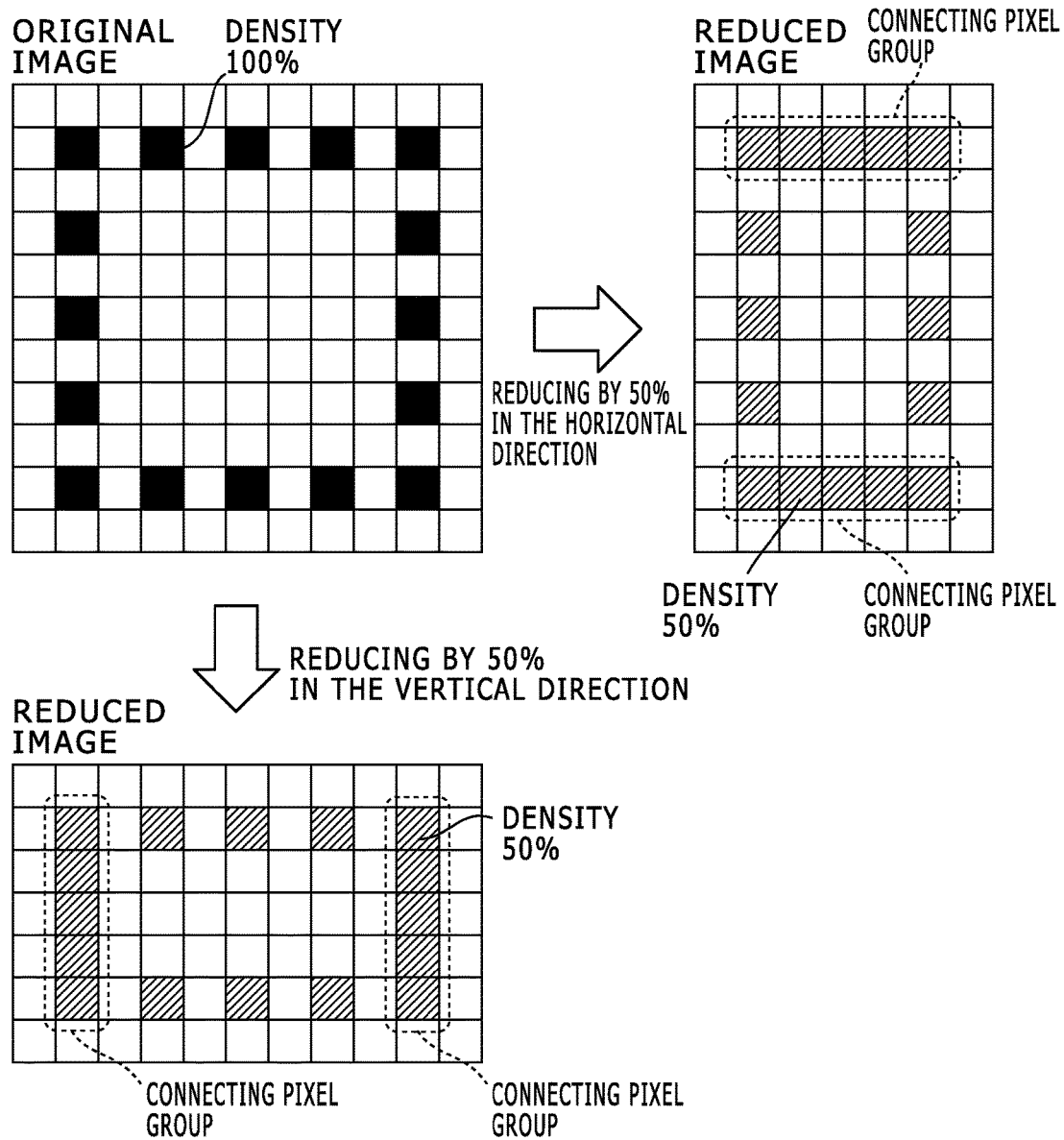
FIG. 4 shows a diagram that explains detection of a ruled line as a dashed line (hereinafter called a dashed ruled line) in an original image in the image processing apparatus shown in FIG. 1.

FIG. 4 shows a diagram that explains detection of a dashed ruled line in an original image in the image processing apparatus shown in FIG. 1.

The aforementioned process detects not only a ruled line as a solid line but a dashed ruled line. For example, as shown in FIG. 4, if a dashed ruled line has one-pixel segments having a density of 100% and one-pixel segment gaps, then the dashed ruled line appears as a connecting pixel group having a density of 50% in the reduced image by the reduction ratio of 50%.

Therefore, since the connecting pixel group detecting unit 22 detects the connecting pixel group in the reduced image as well and the ruled line determining unit 23 determines in the original image a position of a ruled line corresponding to the detected connecting pixel group from a position of the detected connecting pixel group as well, a dashed ruled line is also detected as well as a ruled line as a solid line.

In the aforementioned embodiment, the reduction processing unit 21 (a) sets a reduction direction as one of a horizontal direction and a vertical direction, and (b) reduces an original image along the reduction direction by a predetermined reduction ratio without reducing the original image along a direction perpendicular to the reduction direction and thereby generate a reduced image. Subsequently, the connecting pixel group detecting unit 22 detects a connecting pixel group that continuously extends along the reduction direction in the reduced image, and the ruled line determining unit 23 determines a position of a ruled line in the original image from a position of the detected connecting pixel group in the reduced image on the basis of the reduction ratio.

Consequently, a connecting pixel group in the reduced image has a sufficiently high density and it is restrained to improperly detect an object other than a ruled line as a ruled line, and therefore a ruled line in the original image is correctly detected.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

For example, in the aforementioned embodiment, the reduction processing unit 21, the connecting pixel group detecting unit 22, and the ruled line determining unit 23 may be configured so that the reduction processing unit 21 (a) sets the reduction direction as the horizontal direction and reduces the original image by the predetermined ratio along the reduction direction and thereby generates a horizontally reduced image, and (b) sets the reduction direction as the vertical direction and reduces the original image by the predetermined ratio along the reduction direction and thereby generates a vertically reduced image; the connecting pixel group detecting unit 22 (a) detects a horizontally connecting pixel group in the horizontally reduced image, the horizontally connecting pixel group continuously extending along the reduction direction, and (b) detects a vertically connecting pixel group in the vertically reduced image, the vertically connecting pixel group continuously extending along the reduction direction; and the ruled line determining unit 23 (a) determines a position of a horizontally ruled line in the original image from a position of the horizontally connecting pixel group, (b) determines a position of a vertically ruled line in the original image from a position of the vertically connecting pixel group, and (c) determines a position of a table in the original image on the basis of the determined position of the horizontally ruled line and the determined position of the vertically ruled line. In such a case, for example, crossing points of the horizontally ruled line and the vertical ruled line are determined, each cell in a table is determined on the basis of positions of the crossing points, and consequently a position of the whole table is determined.

Further, in the aforementioned embodiment, the reduction processing unit 21 may be embodied using a specific-purpose hardware in order to reduce a required time for the aforementioned process.

What is claimed is:

1. An image processing apparatus, comprising:
    a reduction processing unit configured to (a) set a reduction direction as one of a horizontal direction and a vertical direction, and (b) reduce an original image along the reduction direction by a predetermined reduction ratio without reducing the original image along a direction perpendicular to the reduction direction and thereby generate a reduced image;
    a connecting pixel group detecting unit configured to detect a connecting pixel group in the reduced image, the connecting pixel group continuously extending along the reduction direction; and
    a ruled line determining unit configured to determine a position of a ruled line in the original image from a position of the connecting pixel group in the reduced image on the basis of the reduction ratio; wherein in order to detect a ruled line as a dashed line in the original image, the reduction ratio is set as a reciprocal of a number that is larger than a gap between segments in the dashed line.

2. The image processing apparatus according to claim 1, wherein the reduction processing unit converts plural pixels in the original image to one pixel in the reduced image, and sets a pixel value of the one pixel as an average value of pixel values of the plural pixels in the original image.

3. The image processing apparatus according to claim 1, wherein the reduction processing unit (a) sets the reduction direction as the horizontal direction and reduces the original image by the predetermined ratio along the reduction direction and thereby generates a horizontally reduced image, and (b) sets the reduction direction as the vertical direction and reduces the original image by the predetermined ratio along the reduction direction and thereby generates a vertically reduced image;
    the connecting pixel group detecting unit (a) detects a horizontally connecting pixel group in the horizontally reduced image, the horizontally connecting pixel group continuously extending along the reduction direction, and (b) detects a vertically connecting pixel group in the vertically reduced image, the vertically connecting pixel group continuously extending along the reduction direction; and
    the ruled line determining unit (a) determines a position of a horizontally ruled line in the original image from a position of the horizontally connecting pixel group, (b) determines a position of a vertically ruled line in the original image from a position of the vertically connecting pixel group, and (c) determines a position of a table in the original image on the basis of the determined position of the horizontally ruled line and the determined position of the vertically ruled line.

4. The image processing apparatus according to claim 1, wherein the ruled line determining unit is further configured to determine coordinate values of two end points of a ruled line in the original image based on pixel coordinate values of two end points of the connecting pixel group in the reduced image.

* * * * *